United States Patent [19]

Dupin

[11] Patent Number: 4,640,908
[45] Date of Patent: Feb. 3, 1987

[54] CATALYST FOR THE OXIDATION OF HYDROGEN SULFIDE AND PROCESS FOR THE PREPARATION OF THE CATALYST

[75] Inventor: Thierry Dupin, Garges/les/Gonesse, France

[73] Assignee: Rhone-Poulenc Specialites Chimiques, Courbevoie, France

[21] Appl. No.: 778,680

[22] Filed: Sep. 23, 1985

Related U.S. Application Data

[63] Continuation of Ser. No. 575,577, Jan. 31, 1984, abandoned.

[30] Foreign Application Priority Data

Jan. 31, 1983 [FR] France .................. 83 01426

[51] Int. Cl.$^4$ .......... B01J 21/04; B01J 21/08; B01J 23/02; B01J 23/10
[52] U.S. Cl. .................. 502/243; 502/244; 502/246; 502/250; 502/254; 502/256; 502/258; 502/259; 502/260; 502/302; 502/303; 502/304; 502/306; 502/308; 502/328; 502/332; 502/335; 502/336; 502/341; 502/349
[58] Field of Search ............ 502/244, 256, 258, 259, 502/302, 303, 304, 306, 308, 328, 332, 335, 336, 502/341, 349, 243, 246, 250, 254, 260; 423/576

[56] References Cited

U.S. PATENT DOCUMENTS

| | | | |
|---|---|---|---|
| 2,881,051 | 4/1959 | Pingard | 23/143 |
| 3,340,011 | 9/1967 | Hoekstra et al. | 502/250 X |
| 3,819,535 | 6/1974 | Huba et al. | 502/306 X |
| 3,931,392 | 1/1976 | Palilla | 423/570 |
| 3,978,004 | 8/1976 | Daumas et al. | 502/336 X |
| 4,062,932 | 12/1977 | Whelan | 423/574 R |
| 4,070,413 | 1/1978 | Imai | 260/683.3 |

FOREIGN PATENT DOCUMENTS

| | | |
|---|---|---|
| 0055164 | 6/1982 | European Pat. Off. . |
| 1064925 | 9/1959 | Fed. Rep. of Germany . |
| 2242144 | 3/1975 | France . |
| 2481254 | 10/1981 | France . |

OTHER PUBLICATIONS

Above References are in Parent Application Ser. No. 575,577.

*Primary Examiner*—W. J. Shine
*Attorney, Agent, or Firm*—Burns, Doane, Swecker & Mathis

[57] ABSTRACT

An improved oxidation catalyst, well adopted for the conversion of $H_2S$-containing acid gases at least in part to elemental sulfur, is facilely prepared by (i) hydrothermally treating at least a portion of an active alumina support, and (ii) then impregnating said at least partially hydrothermally treated support with a catalytically effective amount of a catalytically active oxide phase which comprises the oxides of at least one of the metals, Fe, Cu, Ag, W, Co, Ni, Bi, Cr and Cd, with the proviso (iii) that at least one rare earth oxide, alkaline earth metal oxide, zirconium oxide or silica compound, or any precursor compound thereof, is incorporated into the catalyst during either of the steps (i) or (ii).

23 Claims, No Drawings

CATALYST FOR THE OXIDATION OF HYDROGEN SULFIDE AND PROCESS FOR THE PREPARATION OF THE CATALYST

This application is a continuation of application Ser. No. 575,577, filed Jan. 31, 1984, now abandoned.

BACKGROUND OF THE INVENTION

1. Field of the Invention

The present invention relates to the preparation of an oxidation catalyst, and, more especially, to the preparation of an oxidation catalyst employed in the conversion of hydrogen sulfide into sulfur.

The invention also relates to the catalyst, per se, thus obtained.

2. Description of the Prior Art

It is known to this art to convert hydrogen sulfide into sulfur by a conventional process comprising the following two reaction stages:

$$H_2S + 3/2\ O_2 \rightarrow SO_2 + H_2O$$

$$SO_2 + 2H_2S \rightleftharpoons 3/xS_x + 2H_2O$$

The first stage consists of oxidation of hydrogen sulfide into sulfur dioxide.

The second stage is a catalytic conversion stage which is conventionally carried out by means of a Claus catalyst well known to those skilled in this art, on contact with which the $SO_2$ reacts with $H_2S$ to form sulfur.

In conventional installations for the production of sulfur from "acid gas", namely, from gas containing hydrogen sulfide originating either from natural gas or from refinery gas, the first stage is a heating stage. The acid gas and a stoichiometric amount of oxygen are introduced into a reactor in a manner such that an effluent composed of one-third of $SO_2$ and of two-thirds of $H_2S$ is obtained at the outlet of the reactor. An amount of sulfur vapor is formed at the same time, and this must be eliminated before the gas passes to the second stage, namely, to the Claus catalysis stage.

The heating stage of oxidation of $H_2S$ in the presence of air or oxygen is carried out at a minimum temperature of 900° C. This temperature is easy to maintain, since the reaction is very exothermic provided that the amount of hydrogen sulfide in the gas to be treated attains a value of 15%, preferably at least 35%, by volume.

For values below this limit, it is not possible to maintain a flame temperature sufficient to obtain stable combustion without resorting to significant process modifications.

Furthermore, attempts have been made for many years to solve the problem of purifying acid gases containing less than 35% by volume of $H_2S$ without having to consume enormous amounts of energy in order to maintain the flame temperature at not less than 900° C.

It too is known, from U.S. Pat. No. 4,092,404, that the aforesaid oxidation stage can be carried out using an oxidation catalyst based on vanadium deposited onto a non-alkaline porous refractory support. This oxidation reaction must be carried out by operating strictly at a temperature below 450° C. (850° F.) and is applicable to gases in which the content of $H_2S$ is less than 3%.

Now, the oxidation of $H_2S$ to provide $SO_2$ is highly exothermic and thus requires a complex system for controlling the temperature and severe technological constraints. The catalyst is rapidly deactivated at temperatures above 450° C.

On the other hand, it is known from published European Patent Application No. 39,266 that industrial effluents containing sulfur can be oxidized to sulfur dioxide by catalytic oxidation in the presence of a metal, for example, iron, combined with a porous support. A temperature higher than that mentioned in the above patent cannot be used with this catalyst. Contrariwise, the process described in this patent relates exclusively to the oxidation of hydrogen sulfide to sulfur dioxide and in no way relates to the simultaneous reaction between hydrogen sulfide and sulfur dioxide in order to produce sulfur, per se.

Gases with a low content of $H_2S$ are easily treated by catalytic oxidation, because they do not entail a significant rise in the temperature of the catalyst; however, if the content of $H_2S$ exceeds 3% by volume, an increase in the temperature of the catalyst and deactivation of the latter occur.

According to the prior art, it is thus possible to treat gases containing more than 35% by volume of $H_2S$ in a stage which is solely thermal, or gases containing less than 3% of $H_2S$ in a stage which is solely catalytic, but the prior art does not solve the problem consisting of treating gases containing between 3 and 35% of $H_2S$.

SUMMARY OF THE INVENTION

Accordingly, a major object of the present invention is the provision of an improved catalyst with which the yields of sulfur from the catalytic reactor can be increased and which has an excellent activity over a period of time at high temperatures, and more particularly at temperatures ranging from 700° to 1,000° C.

The present invention also features a process for the preparation of a catalyst for the oxidation of acid gas, characterized in that an active alumina support which has been at least partly subjected to hydrothermal treatment is formed in a first stage and this support is then impregnated, in a second stage, with a catalytically active phase selected from among the oxides of at least one of the following metals: Fe, Cu, Ag, W, Co, Ni, Bi, Cr and Cd, and in that at least one compound selected from among the rare earth oxides, the alkaline earth metal oxides, zirconium oxide and silica, or at least one precursor of such compounds, is introduced at any one of the above stages.

DETAILED DESCRIPTION OF THE INVENTION

More particularly according to the present invention, the hydrothermal treatment of the first stage can be carried out either on an active alumina powder having a poorly crystalline and/or amorphous structure and obtained from bayerite, hydrargillite, nordstrandite, boehmite or diaspore by very rapid dehydration, such as is described, for example, in U.S. Pat. No. 2,915,365, or on alumina agglomerates obtained, for example, from active alumina powder having a poorly crystalline and/or amorphous structure and agglomerated as described, in particular, in French Pat. No. 1,438,497 or U.S. Pat. No. 2,881,051.

The hydrothermal treatment consists of treating, in the vapor or liquid phase, alumina agglomerates or alumina powder having a poorly crystalline and/or amorphous structure with an aqueous medium comprising an acid and/or a salt which dissociates in water to give a solution having a pH of less than 9. This treatment is described, in particular, in European Pat. No. 15,196 as applicable to an active alumina powder having a poorly crystalline and/or amorphous structure. A particular form of use is described in published European Patent Application No. 55,164 as applicable to active alumina agglomerates.

The hydrothermal treatment is carried out at a temperature ranging from 80° C. to 250° C. for a period of time ranging from about a few minutes to 36 hours.

If active alumina powder having a poorly crystalline and/or amorphous structure is used as the starting material, the active alumina support can be shaped, in particular, by techniques which are known to the art, such as, for example, by the so-called "oil drop" technique, or by extrusion.

The technique of shaping by extrusion is described, for example, in U.S. Pat. No. 4,120,942. The technique of shaping by "oil drop" is described, for example, in published European Patent Application No. 15,801.

The technique of shaping by "oil drop" comprises preparing, in a first stage, a mixture at a pH of less than 7.5 of, on the one hand, 10 to 90% by weight of an ultrafine alumina sol originating from the hydrothermal treatment of active alumina powder having a poorly crystalline and/or amorphous structure and, on the other hand, 10 to 90% by weight (based on total solids) of spheroidal alumina particles which have not necessarily been subjected to the hydrothermal treatment, and shaping, in a second stage, by coagulation of drops of the mixture, for example, by dripping the mixture into a water-immiscible liquid, such as petroleum, whereupon spherical particles are formed, which are coagulated with a gelling agent, such as ammonia, and are then dried.

The agglomerates or aluminas shaped by the "oil drop" technique or by extrusion are then calcined at a temperature ranging from 500° to 1,000° C., and constitute the active alumina supports of the present invention.

The active alumina support obtained has been at least partly subjected to hydrothermal treatment. The technique of shaping by extrusion can be carried out starting from a mixture comprising an active alumina powder having a poorly crystalline and/or amorphous structure which has been subjected to the hydrothermal treatment described above, and optionally an alumina powder which has not been subjected to this treatment. The technique of shaping by "oil drop" can be carried out on an active alumina sol deriving from an alumina which has been subjected to hydrothermal treatment and spheroidal particles which have not been subjected to this treatment, or spheroidal particles which have in fact been subjected to such treatment. The support thus obtained always contains a minimal amount of alumina which has been subjected to the hydrothermal treatment which is from 10% and can be up to 100% of the alumina treated by heat; this amount preferably ranges from 30 to 100%.

In a first embodiment of introduction of the compounds according to the invention, these compounds or their precursors can be introduced over the course of the first stage of the process for the preparation of the catalyst for oxidation of acid gas, at the time of the hydrothermal treatment. This introduction is carried out in an aqueous medium such as that defined above, which consists of an acid and/or a salt which dissociates in water to give a solution having a pH of less than 9.

According to the present invention, the compounds which can be used are selected, in particular, from the oxides of the rare earths, the alkaline earth metals and zirconium, and silica.

In a preferred embodiment of the invention, the compounds are selected from among the oxides of lanthanum, neodymium, praseodymium and zirconium, and silica.

Without departing from the scope of the present invention, it is possible to introduce a compound which is a precursor of the above oxides, such as, for example, salts of the rare earths, zirconium and the alkaline earth metals which can be decomposed under the influence of heat, or organic silicates. These precursors should be converted into the desired oxides over the course of the successive calcination operations.

These oxides or their precursors can be introduced either by themselves or as mixtures with one another.

The second stage of the process according to the invention consists of introducing the catalytically active phase at the level of the active alumina support which has already been shaped. This introduction can be effected, in particular, by impregnation either with precursors of the catalytically active elements or by mixing the catalytically active elements with alumina over the course of the operation of shaping of the active alumina support.

The catalytically active elements are advantageously selected from among the oxides of the following metals: Fe, Cu, Ag, W, Co, Ni, Bi, Cr and Cd.

The use of iron oxide as the active phase is particularly advantageous, since iron oxide is industrially available and is less expensive vis-a-vis the other elements which can be used.

It is also clearly possible to use a mixture of the oxides of these metals, without exceeding the ambit of the present invention.

According to a second embodiment of introduction of the compounds according to the invention, the oxides or their precursors can be introduced over the course of this second stage. In particular, they can be introduced by impregnation, separately or together with the catalytically active elements or the precursors of these elements.

After this second stage, the catalyst is calcined at a temperature ranging from 300° to 1,000° C., preferably from 500° C. to 800° C.

The amounts of oxides of the rare earths, the alkaline earth metals or zirconium or of silica introduced ranges from 0.5 to 20% by weight of oxide, based upon the total weight of catalyst, and preferably ranges from 1 to 7%.

The amount of catalytically active phase introduced ranges from 1 to 15% of the weight of the catalyst, expressed by weight of metal oxide, and preferably ranges from 3 to 10%.

The catalyst obtained via the subject process has the following characteristics:

Its specific surface area (SSA) is greater than 40 $m^2/g$ and preferably ranges from 80 to 200 $m^2/g$; its bulk density (BD) ranges from 0.38 to 0.9 $g/cm^3$; and its total pore volume (TPV) ranges from 1.30 to 0.3 $cm^3/g$.

These characteristics are determined as described in published European Patent Application No. 55,164.

The subject catalyst is used to treat acid gas, namely, to ensure conversion of at least some of the hydrogen sulfide into sulfur. On the one hand, it ensures optimum production of sulfur relative to conventional processes, and, on the other hand, it provides an effluent issuing from the catalytic reactor with a concentration of hydrogen sulfide, based on the sulfur dioxide, of 2. This ratio of 2 is obtained provided that the flow rates of $H_2S$ and oxygen in the gas are stoichiometrically balanced.

This catalyst enables acid gases containing amounts of hydrogen sulfide of less than 35%, and in particular from 3 to 15%, by volume, to be treated.

The subject catalyst which is capable of treating these acid gases containing a low concentration of hydrogen sulfide can nevertheless, contrary to an established technical preconception, be used as a support without deterioration at very high temperatures, in particular at temperatures ranging from 700° to 1,000° C., at which the activity of the catalyst is optimum.

The contact time between the gaseous reaction mixture and the oxidation catalyst can vary from 0.5 to 10 seconds, these values being given under standard conditions of pressure and temperature.

The gas originating from the catalyst furnace is composed of two parts of $H_2S$ per one part of $SO_2$ and a more or less significant amount of sulfur vapor, depending upon the reaction conditions of temperature, gas flow and amount of catalyst. This gas is purified from sulfur vapor by condensation and is then reheated, prior to passage over a series of Claus reactors in which $SO_2$ reacts with $H_2S$ in order to form a fresh amount of sulfur, only a gas containing a minimal total amount of sulfur being allowed to escape into the atmosphere.

In order to further illustrate the present invention and the advantages thereof, the following specific examples are given, it being understood that same are intended only as illustrative and in nowise limitative.

EXAMPLE 1

Comparative example

An activated alumina having a poorly crystalline and/or amorphous structure obtained by rapid dehydration of hydrargillite in a stream of hot gases, the inlet temperature of which was about 800° C., the contact time being about 0.5 second, was used as the starting alumina.

After pulverization, this powder was agglomerated in the form of beads with the aid of a rotating bowl. To this effect, the powder and water were simultaneously introduced into the rotating bowl. The beads formed were continuously removed by ejection resulting from the centrifugal force.

After drying at 110° C., the beads were calcined at 800° C. under air. An active alumina support which had not been subjected to any hydrothermal treatment was thus obtained.

The beads obtained were impregnated with a solution of ferric nitrate in a manner such that the catalyst obtained after drying and calcination at 800° C. contained 5% of the catalytically active phase in the form of $Fe_2O_3$. The characteristics of the catalyst were as follows:

$SSA = 105 \ m^2 g^{-1}$
$BD = 0.79 \ g/cm^3$
$TPV = 0.45 \ cm^3/g$

The alumina support used in this example had not been subjected to any hydrothermal treatment and no compound selected from among the rare earth oxides, the alkaline earth metal oxides, zirconium oxide and silica, or their precursors, had been introduced thereto.

EXAMPLE 2

The beads obtained as described in Example No. 1 of published European Patent Application No. 55,164 were treated in the following manner:

The beads were impregnated with a solution containing lanthanum nitrate, neodymium nitrate and ferric nitrate in a manner such that the following composition, based on the weight of the catalyst, was obtained:

$Fe_2O_3 = 5\%$
$La_2O_3 = 1\%$
$Nd_2O_3 = 1\%$

After drying and calcination at 800° C. in air, the catalyst had the following characteristics:

$SSA = 103 \ m^2 g^{-1}$
$BD = 0.46 \ g/cm^3$
$TPV = 97 \ cm^3/g$

All of the alumina comprising the active alumina support utilized had been subjected to hydrothermal treatment.

EXAMPLE 3

A support consisting of active alumina beads was prepared by the oil drop process described in published European Patent Application No. 15,801, using the following sources of alumina:

The first was an ultrafine alumina sol obtained as described in Example No. 3 of published European Patent Application No. 15,196, before calcination. It was thus an active alumina having a poorly crystalline and/or amorphous structure, which had been subjected to hydrothermal treatment.

The second was active alumina as described in Example 1 of published European Patent Application No. 15,801, employed in the form of spheroidal particles. This alumina had not been subjected to any hydrothermal treatment.

These two sources of alumina were mixed in water and the pH was adjusted to 6. The proportion by weight of the two sources of alumina was 30% for the first and 70% for the second, calculated as $Al_2O_3$.

After draining, drying and calcining, beads were obtained, and same were treated in the following manner:

The beads were impregnated with an alcoholic solution of ethyl silicate such that a product containing 2.2% of $SiO_2$ was obtained. After drying and calcining at 500° C. in an inert atmosphere, a second impregnation was carried out using a solution of copper nitrate and silver nitrate in a manner such that, after drying and calcining at 800° C., the catalyst had the following composition:

$SiO_2 = 2\%$
$CuO = 2\%$
$Ag_2O = 3\%$

The characteristics of the catalyst obtained were as follows:

$SSA = 137 \ m^2 g^{-1}$
$BD = 0.47 \ g/cm^3$
$TPV = 97 \ cm^3/g$

30% of the alumina contained in the active alumina support had been subjected to hydrothermal treatment.

EXAMPLE 4

Ultrafine alumina as described in Example No. 2 of published European Patent Application No. 15,196 was used, this alumina being the result of hydrothermal treatment of an active alumina powder having a poorly crystalline and/or amorphous structure; such alumina was kneaded in the presence of water and an iron oxide powder in the form of very finely ground $Fe_2O_3$ was incorporated into the paste obtained. The mixture thus obtained was extruded, dried and calcined at 600° C.

The product obtained was then impregnated with barium nitrate and subsequently dried and calcined at 800° C.

The catalyst thus obtained had the following composition and characteristics:
BaO: 2.5%
$Fe_2O_3$: 10%
SSA: 119 $m^2g^{-1}$
BD: 0.65 $g/cm^3$
TPV: 0.61 $cm^3/g$ All of the alumina contained in the activated alumina support had been subjected to hydrothermal treatment.

EXAMPLE 5

The active alumina support used in Example No. 2 above was impregnated with a solution of zirconium oxychloride in a manner such that a product containing 4.2% by weight of $ZrO_2$ was obtained, after drying and calcining at 800° C.

The product obtained was then impregnated with chromic acid in a manner such that a catalyst having the following composition was obtained, after drying and calcining at 800° C.:
$ZrO_2$: 4.0%
$Cr_2O_3$: 5.0%

The characteristics of the catalyst were as follows:
SSA: 99 $m^2g^{-1}$
BD: 0.47 $g/cm^3$
TPV: 98 $cm^3/g$ All of the alumina contained in the active alumina support had been subjected to hydrothermal treatment.

EXAMPLE 6

A series of catalysts was prepared starting from the active alumina support as described in Example No. 2 above and containing 2.2% of lanthanum oxide, introduced by impregnation with a solution of lanthanum nitrate, drying and calcination at 700° C.

These catalysts were obtained by impregnation with a solution containing the precursors of the active phase. The following Table I reports the precursors, the composition and the characteristics of the catalysts obtained after drying and calcining at 800° C. in air.

TABLE I

| Catalyst No. | Precursor of the active phase | Composition $La_2O_3$ active phase | SSA | BD | TPV |
|---|---|---|---|---|---|
| 6 | metatungstic acid | 2% $WO_3$ = 7% | 99 | 0.47 | 95 |
| 7 | cobalt nitrate | 2% CoO = 6% | 101 | 0.46 | 96 |
| 8 | nickel nitrate | 2% NiO = 8% | 95 | 0.46 | 96 |
| 9 | bismuth nitrate + $HNO_3$ | 2% $Bi_2O_3$ = 9% | 96 | 0.47 | 94 |
| 10 | cadmium chloride | 2% CdO = 7% | 103 | 0.46 | 96 |

EXAMPLE 7

A gas having the following composition was introduced into a laboratory reactor:
$H_2S$ = 12%
$O_2$ = 6%
$CO_2$ = 45%
$N_2$ = 30%
$H_2O$ = 7%

Under isothermal conditions, the temperature of the reactor was maintained at 850° C. and the velocity of the gases was such that the volume velocity was 900 $h^{-1}$, calculated under normal conditions.

The catalysts were compared in the Table II which follows by measuring the activity for conversion of $H_2S$ by the ratio $H_2S/SO_2$ at the outlet of the catalytic reactor after 8 hours and after 100 hours of operation, and by measuring the yield of sulfur obtained.

TABLE II

| | After 8 hours | | After 100 hours | |
|---|---|---|---|---|
| Catalyst No. | Yield of sulfur % | $H_2S/SO_2$ | Yield of sulfur % | $H_2S/SO_2$ |
| 1 | 58 | 2.0 | 34 | 1.8 |
| 2 | 59 | 2.0 | 57 | 1.99 |
| 3 | 58 | 2.0 | 52 | 1.99 |
| 4 | 58 | 2.0 | 55 | 1.97 |
| 5 | 57 | 2.0 | 53 | 1.96 |
| 6 | 58 | 2.0 | 56 | 1.99 |
| 7 | 58 | 2.0 | 55 | 1.98 |
| 8 | 57 | 2.0 | 52 | 1.95 |
| 9 | 58 | 2.0 | 54 | 1.99 |
| 10 | 58 | 2.0 | 53 | 1.97 |

The above results clearly evidence that all of the catalysts according to the invention have an activity which, over a period of time, is far superior to that of catalysts known to this art for treating acid gases containing from 3 to 35% of $H_2SO$ at a temperature greater than 450° C., and more particularly from 700° to 1,000° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an oxidation catalyst comprising (i) hydrothermally treating at least a portion of an active alumina support with an aqueous medium, in liquid or vapor phase, comprising an acid, salt, or mixture thereof which dissociates in water to provide a solution having a pH of less than about 9, at a temperature ranging from about 80° C. to about 250° C. for up to 36 hours, and (ii) thence depositing upon said at least partially hydrothermally treated support a catalytically effective amount of a catalytically active oxide phase which comprises the oxides of at least one of the metals, Fe, Cu, Ag, W, Co, Ni, Bi, Cr and Cd, with the provision (iii) that at least one rare earth oxide, alkaline earth metal oxide, zirconium oxide or silica, or any precursor compound thereof, is incorporated into the catalyst during either of the steps (i) or (ii).

2. The process as defined by claim 1, wherein during the step (i) an active alumina powder having a poorly crystalline and/or amorphous structure is agglomerated into said active alumina support, and said support thus shaped is then hydrothermally treated.

3. The process as defined by claim 1, wherein during the step (iii) at least one of lanthanum, neodymium, praseodymium or zirconium oxide, or silica, is incorporated into the catalyst.

4. The process as defined by claim 1, said catalytically active oxide phase comprising from 1 to 15% by weight of the catalyst.

5. The process as defined by claim 1, said at least one oxide or silica incorporated during the step (iii) comprising from 0.5 to 20% by weight of the catalyst.

6. The process as defined by claim 1, comprising hydrothermally treating from 10 to 100% of said support.

7. The process as defined by claim 1, comprising hydrothermally treating from 30 to 100% of said support.

8. The process as defined by claim 1, wherein said step of depositing upon said at least partially hydrothermally treated support a catalytically active oxide phase comprises the steps of (i) impregnating said support with a solution of a precursor of said catalytically active oxide phase and (ii) calcining the product catalyst at a temperature ranging from 300° to 1000° C.

9. The process as defined by claim 1, wherein said step of depositing upon said at least partially hydrothermally treated support a catalytically effective amount of a catalytically active oxide phase comprises the steps of (i) mixing said catalytically effective oxides with the alumina while said active alumina support is shaped and (ii) calcining the product catalyst at a temperature ranging from 300° to 1000° C.

10. The process as defined by claim 8, wherein the precursors of said catalytically active elements comprise at least one of a salt and an acid of said elements.

11. A process as defined in claim 8, wherein the precursors of catalytically active elements comprise at least one of the nitrates of the elements Fe, Cu, Ag, Co, Ni, and Bi, the halides of Cd and the acids comprising the elements Cr or W.

12. A process as defined by claim 1, wherein said rare earth oxide, alkaline earth oxide, zirconium oxide or silica, or precursor thereof, is incorporated into said catalyst during step (ii), simultaneously with the process in which the catalytically active oxide phase is deposited upon the at least partially hydrothermally treated alumina support.

13. A process for the preparation of an oxidation catalyst, comprising the steps of:
 (i) hydrothermally treating at least a portion of an active alumina powder having a poorly crystalline and/or amorphous structure with an aqueous medium comprising an acid, salt, or mixture thereof, which dissociates in water to provide a solution having a pH of less than about 9, at a temperature ranging from about 80° C. to about 250° C. for up to about 36 hours,
 (ii) admixing with the hydrothermally treated powder at least one of a untreated active alumina and hydrothermally treated, spheroidal particulates of an active alumina,
 (iii) shaping the resulting admixture of active alumina powder which is at least partially hydrothermally treated into an active alumina support, and
 (iv) depositing upon the at least partially hydrothermally treated active alumina support a catalytically effective amount of a catalytically active oxide phase which comprises oxides of at least one of the metals Fe, Cu, Ag, W, Co, Ni, Bi, Cr and Cd, with the proviso
 (v) that at least one rare earth oxide, alkaline earth metal oxide, zirconium oxide or silica, or any precursor compound thereof, is incorporated into the catalyst during either of the steps (i) or (iv).

14. A process as defined by claim 13, wherein said catalytically active oxide phase is deposited upon said active alumina support by impregnating said support or the active alumina powder from which it is formed with a solution of at least one precursor compound of oxides of at least one of said metals Fe, Cu, Ag, W, Co, Ni, Bi, Cr and Cd, and thereafter calcining at least one of said alumina support and said alumina powder to form said oxides.

15. A process as defined by claim 14, wherein said rare earth oxide, alkaline earth metal oxide, zirconium oxide or silica, or precursor thereof, is incorporated into said catalyst during step (iv), simultaneously with the process in which the catalytically active oxide phase is deposited upon the at least partially hydrothermally treated alumina support.

16. The process as defined by claim 14, said untreated active alumina comprising spheroidal particulates.

17. The process as defined by claim 14, wherein said admixture is shaped into the active alumina support by extrusion.

18. The process as defined by claim 14, wherein said admixture is shaped into the active alumina support by oil drop technique.

19. The process as defined by claim 14, wherein said admixture is shaped into the active alumina support by extrusion.

20. The process as defined by claim 14, wherein said admixture is shaped into the active alumina support by oil drop technique.

21. An oxidation catalyst comprising an at least partially hydrothermally treated active alumina support upon which is deposited a catalytically effective amount of a catalytically active oxide phase which comprises the oxides of at least one of the metals, Fe, Cu, Ag, W, Co, Ni, Bi, Cr and Cd, said catalyst also having incorporated therein at least one rare earth oxide, alkaline earth metal oxide, zirconium oxide or silica, said catalyst having a specific surface area of greater than 40 $m^2/g$, a bulk density ranging from 0.38 to 0.9 $g/cm^3$, and a total pore volume ranging from 1.30 to 0.3 $cm^3/g$, wherein the hydrothermal treatment of said portion of the active alumina support comprises contacting said support with an aqueous medium, in liquid or vapor phase, comprising an acid, salt, or mixture thereof which dissociates in water to provide a solution having a pH of less than about 9, at a temperature ranging from about 80° C. to about 250° C. for up to 36 hours.

22. The oxidation catalyst as defined by claim 21, said catalytically active oxide phase comprising from 1 to 15% by weight thereof.

23. The oxidation catalyst as defined by claim 22, said at least one oxide or silica incorporated therein comprising from 0.5 to 20% by weight thereof.

* * * * *